April 5, 1927.

L. LENHARDT

MILLING TOOL

Filed July 14, 1926

1,623,927

Lawrence Lenhardt, INVENTOR

BY Victor J. Evans

ATTORNEY

Patented Apr. 5, 1927.

1,623,927

UNITED STATES PATENT OFFICE.

LAWRENCE LENHARDT, OF SPENCERPORT, NEW YORK, ASSIGNOR OF ONE-HALF TO FRANK DE FELICE, OF ROCHESTER, NEW YORK.

MILLING TOOL.

Application filed July 14, 1926. Serial No. 122,423.

This invention relates to a milling tool, the general object of the invention being to provide a tool that will cut smoothly and straight, one that will not fill up with metal and one which will not be increased in size by sharpening.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
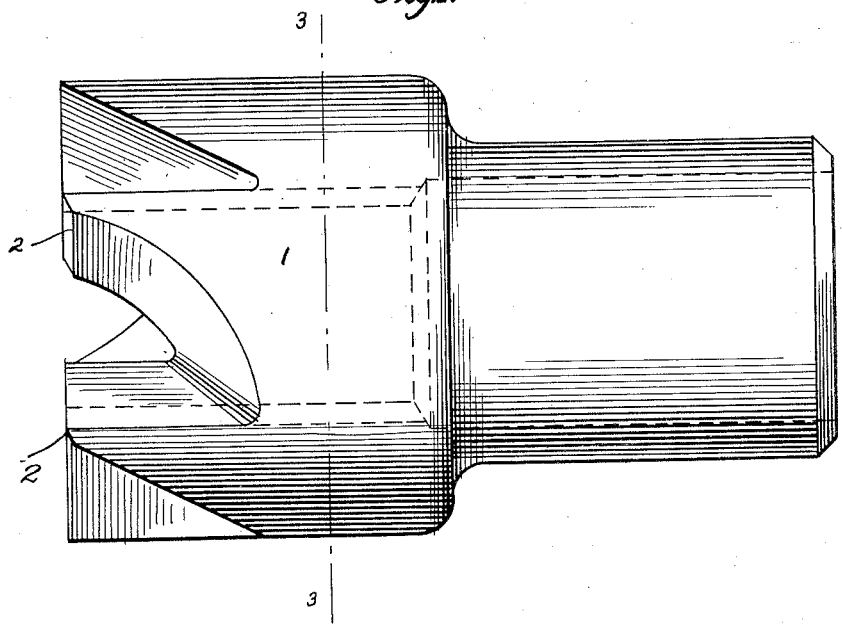
Figure 1 is an elevation of the device.
Figure 2:
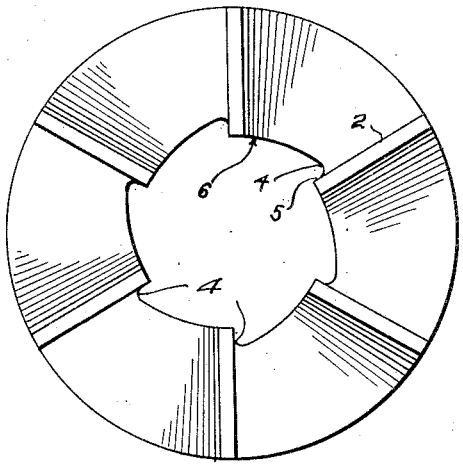
Figure 2 is an end view thereof.

In the drawings, 1 indicates the head of the tool which is made hollow and which is formed with the cutting teeth 2. The inside diameter of the head is practically straight and the inner walls are formed with the flutes or recesses 4 which form internal teeth 5. These teeth 5 are shaped so as to form a cutting edge with clearance, shown at 6.

The operation of this tool is as follows:—

Figure 3:
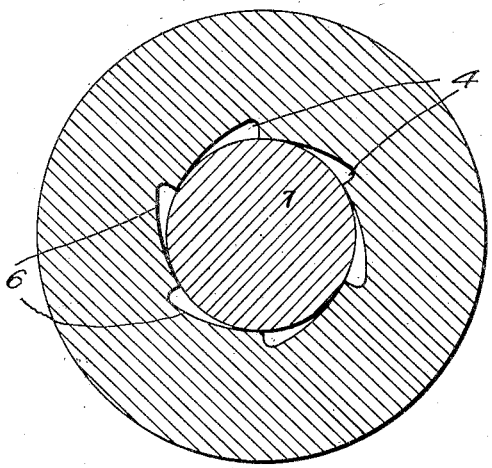
Figure 3 is a section on line 3—3 of Figure 1.

As the metal is cut by the surfaces 2, it is broken up in chips. The breaking up of these metal chips and the friction produced by the cutting surfaces 2 produce a fine metal dust and as the metal enters the interior of the head, it carries some of the metal dust along with it. Instead of this dust causing excessive friction and the filling up of the interior of the head as in tools now made, the metal dust immediately drops into the flutes 4, where it is out of the way, and should the metal have a tendency to expand, which would cause friction, the cutting edge of the internal teeth 5 will cut the metal away and keep it from producing friction, as shown in Figure 3, where the metal core is shown at 7.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A milling tool comprising a hollow head having teeth formed at its free end and having curved recesses formed in its inner wall to provide teeth for cutting an object entering the interior part of the head.

2. A milling tool comprising a hollow head having teeth formed at its free end and having curved recesses formed in its inner wall to provide teeth for cutting an object entering the interior part of the head, the bore of the head being of the same diameter throughout its length.

In testimony whereof I affix my signature.

LAWRENCE LENHARDT.